(12) United States Patent
Makinen et al.

(10) Patent No.: US 12,319,540 B2
(45) Date of Patent: Jun. 3, 2025

(54) METHOD AND AN ARRANGEMENT FOR ALIGNING ELEVATOR GUIDE RAILS

(71) Applicant: Kone Corporation, Helsinki (FI)

(72) Inventors: Harri Makinen, Helsinki (FI); Mikael Haag, Helsinki (FI); Ville Malmiala, Helsinki (FI); Markku Haivala, Helsinki (FI); Joonas Jokela, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/510,066

(22) Filed: Nov. 15, 2023

(65) Prior Publication Data

US 2024/0083716 A1  Mar. 14, 2024

Related U.S. Application Data

(63) Continuation of application No. PCT/EP2021/062987, filed on May 17, 2021.

(51) Int. Cl.
*B66B 19/00* (2006.01)
*G01C 15/10* (2006.01)

(52) U.S. Cl.
CPC .......... *B66B 19/002* (2013.01); *G01C 15/105* (2013.01)

(58) Field of Classification Search
CPC .................. B66B 19/002; B66B 7/024
See application file for complete search history.

(56) References Cited

U.S. PATENT DOCUMENTS

| | | | | |
|---|---|---|---|---|
| 4,593,794 A | * | 6/1986 | Russeau | B66B 19/002 52/745.2 |
| 7,654,006 B1 | * | 2/2010 | Mooney | B66B 7/1246 33/286 |
| 8,397,437 B2 | * | 3/2013 | Barneman | B66B 19/002 52/745.18 |
| 2009/0120734 A1 | | 5/2009 | Barneman et al. | |

FOREIGN PATENT DOCUMENTS

| | | | |
|---|---|---|---|
| EP | 2872432 A1 | 5/2015 | |
| EP | 3336040 A1 * | 6/2018 | ........... B66B 19/002 |
| JP | H06100268 A | 4/1994 | |
| JP | 2003104653 A | 4/2003 | |
| JP | 2016155658 A | 9/2016 | |

OTHER PUBLICATIONS

International Search Report and Written Opinion for Internatinal Application No. PCT/EP2021/062987 dated Jan. 31, 2022.

\* cited by examiner

*Primary Examiner* — Diem M Tran
(74) *Attorney, Agent, or Firm* — Harness, Dickey & Pierce, P.L.C.

(57) ABSTRACT

A method and arrangement for aligning elevator guide rails includes measuring the position of two opposite guide rails in respect of the direction between guide rails (DGB) direction and the back to front wall direction (BTF) direction with a plumb line and a measurement device arranged at each guide rail. Each measurement device includes a guide shoe supported on at least two guide surfaces of the guide rail, a measurement frame connected to the guide shoe, and a sensor for sensing the position of the plumb line in respect of the measurement frame. The twist of the guide rails is measured with a wire extending between the two measurement devices and an edge sensor arranged in connection with at least one of the two measurement devices.

17 Claims, 5 Drawing Sheets

METHOD AND AN ARRANGEMENT FOR ALIGNING ELEVATOR GUIDE RAILS

CROSS-REFERENCE TO RELATED APPLICATION

This application is a continuation of PCT International Application No. PCT/EP2021/062987 which has an International filing date of May 17, 2021, the entire contents of which are incorporated herein by reference.

FIELD

The invention relates to a method and an arrangement for aligning elevator guide rails.

BACKGROUND

An elevator may comprise a car, a shaft, hoisting machinery, ropes, and a counterweight. A separate or an integrated car frame may surround the car.

The hoisting machinery may be positioned in the shaft. The hoisting machinery may comprise a drive, an electric motor, a traction sheave, and a machinery brake. The hoisting machinery may move the car upwards and downwards in the shaft. The machinery brake may stop the rotation of the traction sheave and thereby the movement of the elevator car.

The car frame may be connected by the ropes via the traction sheave to the counterweight. The car frame may further be supported with guiding means at guide rails extending in the vertical direction in the shaft. The guide rails may be attached with fastening brackets to the side wall structures in the shaft. The guiding means keep the car in position in the horizontal plane when the car moves upwards and downwards in the shaft. The counterweight may be supported in a corresponding way on guide rails that are attached to the wall structure of the shaft.

The car may transport people and/or goods between the landings in the building. The wall structure of the shaft may be formed of solid walls or of an open beam structure or of any combination of these.

EP 2 872 432 B1 discloses a guide rail straightness measuring system for elevator installations. The system comprises at least one plumb line mounted vertically in the runway adjacent to the guide rail and at least one sensor arrangement supported on the guide rail. The sensor arrangement comprises a measurement frame, at least one guide shoe connected to the measurement frame for supporting the sensor arrangement on the guide rail, a bias means for placing and biasing the measurement frame against the guide surface, and at least one sensor means for sensing the position of the plumb line with respect to the measurement frame.

The conditions in an elevator shaft are, however, harsh during the alignment work. The visibility in the shaft is often poor which may make it difficult the read the alignment tools. The rope bundle in the shaft prevents accurate DBG measurement. Repetitive accurate work in the shaft is thus challenging. All this is time consuming, and if done poorly, a laborious re-work is required. The guide rail alignment results are normally not recorded or documented.

SUMMARY

An object of the invention is an improved method and arrangement for aligning elevator guide rails.

The method for aligning elevator guide rails according to the invention is defined in claim 1.

The arrangement for aligning elevator guide rails according to the invention is defined in claim 6.

The invention makes it possible to improve the quality of the alignment of the guide rails.

The invention makes is possible to detect plumbing errors.

The invention makes it possible to record and document the results of the alignment.

The invention may be used in manual and in automated guide rail alignment.

The invention may be realized with a limited number of sensors.

Only one plumb line is needed at each guide rail in the invention.

DRAWINGS

The invention will in the following be described in greater detail by means of preferred embodiments with reference to the attached drawings, in which.

DETAILED DESCRIPTION

Figure 1:
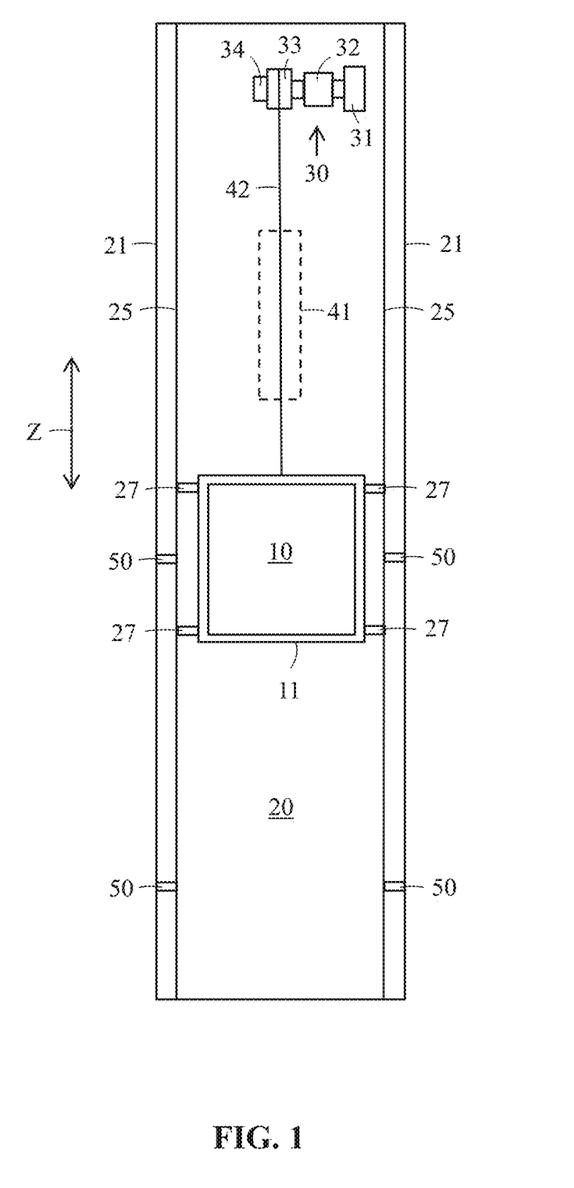
FIG. 1 shows a side view of an elevator.
Figure 2:
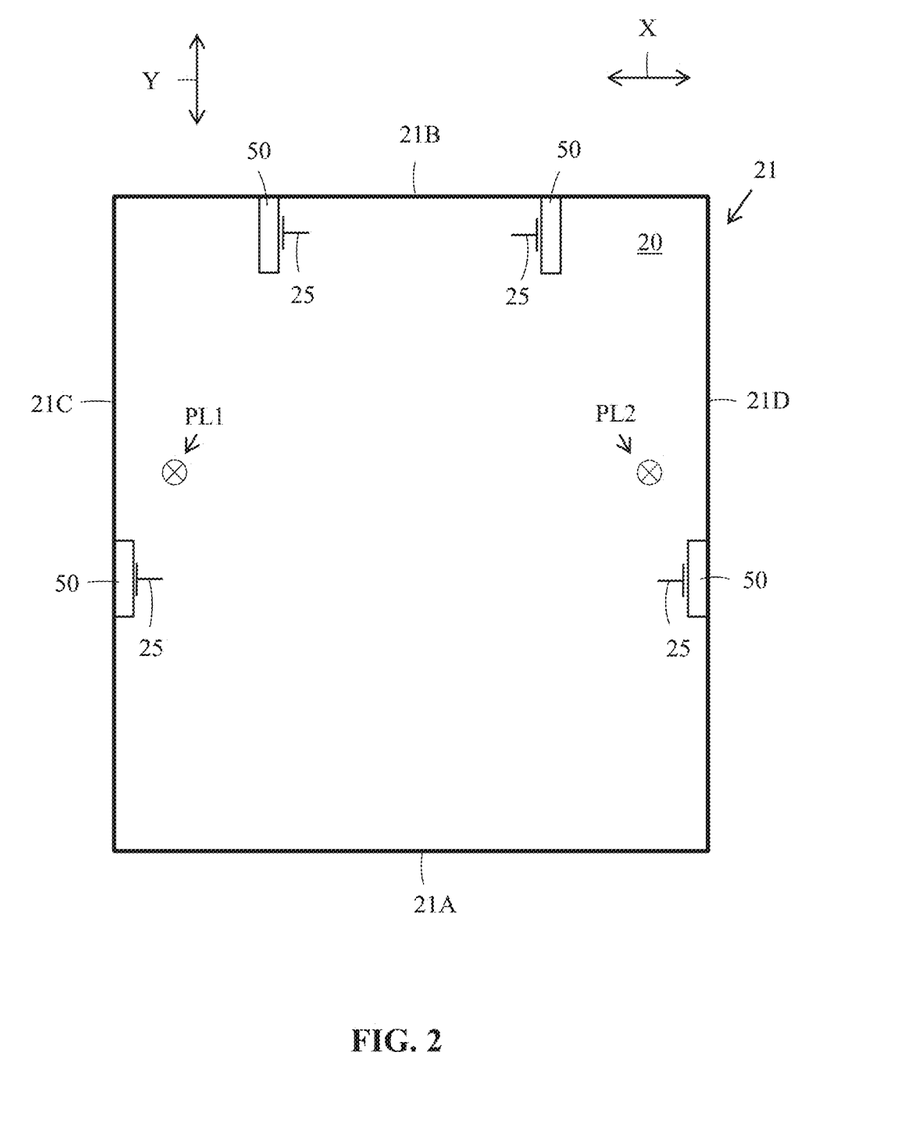
FIG. 2 shows a horizontal cross section of the elevator.

FIG. 1 shows a side view and FIG. 2 shows a horizontal cross section of the elevator.

The elevator may comprise a car 10, an elevator shaft 20, hoisting machinery 30, ropes 42, and a counterweight 41. A separate or an integrated car frame 11 may surround the car 10.

The hoisting machinery 30 may be positioned in the shaft 20. The hoisting machinery may comprise a drive 31, an electric motor 32, a traction sheave 33, and a machinery brake 34. The hoisting machinery 30 may move the car 10 in a vertical direction Z upwards and downwards in the vertically extending elevator shaft 20. The machinery brake 34 may stop the rotation of the traction sheave 33 and thereby the movement of the elevator car 10.

The car frame 11 may be connected by the ropes 42 via the traction sheave 33 to the counterweight 41. The car frame 11 may further be supported with guiding means 27 at guide rails 25 extending in the vertical direction in the shaft 20. The guiding means 27 may comprise rolls rolling on the guide rails 25 or gliding shoes gliding on the guide rails 25 when the car 10 is moving upwards and downwards in the elevator shaft 20. The guide rails 25 may be attached with fastening brackets 50 to the side wall structures 21 in the elevator shaft 20. The guiding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The wall structure 21 of the shaft 20 may be formed of solid walls 21 or of open beam structure or of any combination of these. One or more of the walls may thus be solid and one or more of the walls may be formed of an open beam structure. The shaft 20 may be comprise a front wall 21A, a back wall 21B and two opposite side walls 21C, 21D. There may be two guide rails 25 for the car 10. The two car guide rails 25 may be positioned on opposite side walls 21C, 21D. There may further be two guide rails 25 for the counterweight 41. The two counterweight guide rails 25 may be positioned on the back wall 21B.

The guide rails 25 may extend vertically along the height of the elevator shaft 20. The guide rails 25 may thus be formed of guide rail elements of a certain length e.g. 5 m. The guide rail elements 25 may be installed end-on-end one after the other. The guide rail elements 25 may be attached to each other with connection plates extending between the end portions of two consecutive guide rail elements 25. The connection plates may be attached to the consecutive guide rail elements 25. The ends of the guide rails 25 may comprise form locking means to position the guide rails 25 correctly in relation to each other. The guide rails 25 may be attached to the walls 21 of the elevator shaft 20 with support means at support points along the height of the guide rails 25.

The car 10 may transport people and/or goods between the landings in the building.

FIG. 2 shows plumb lines PL1, PL2 in the shaft 20, which may be produced by plumbing of the shaft 20 before the installation of the elevator. The plumb lines PL1, PL2 may be formed with traditional plumb wires.

FIG. 1 shows a first direction Z, which is a vertical direction in the elevator shaft 20. FIG. 2 shows a second direction X, which is the direction between the guide rails (DBG) and a third direction Y, which is the direction from the back wall to the front wall (BTF) in the shaft 20. The second direction X is perpendicular to the third direction Y. The second direction X and the third direction Y are perpendicular to the first direction Z. The second direction X and the third direction Y are horizontal.

Figure 3:
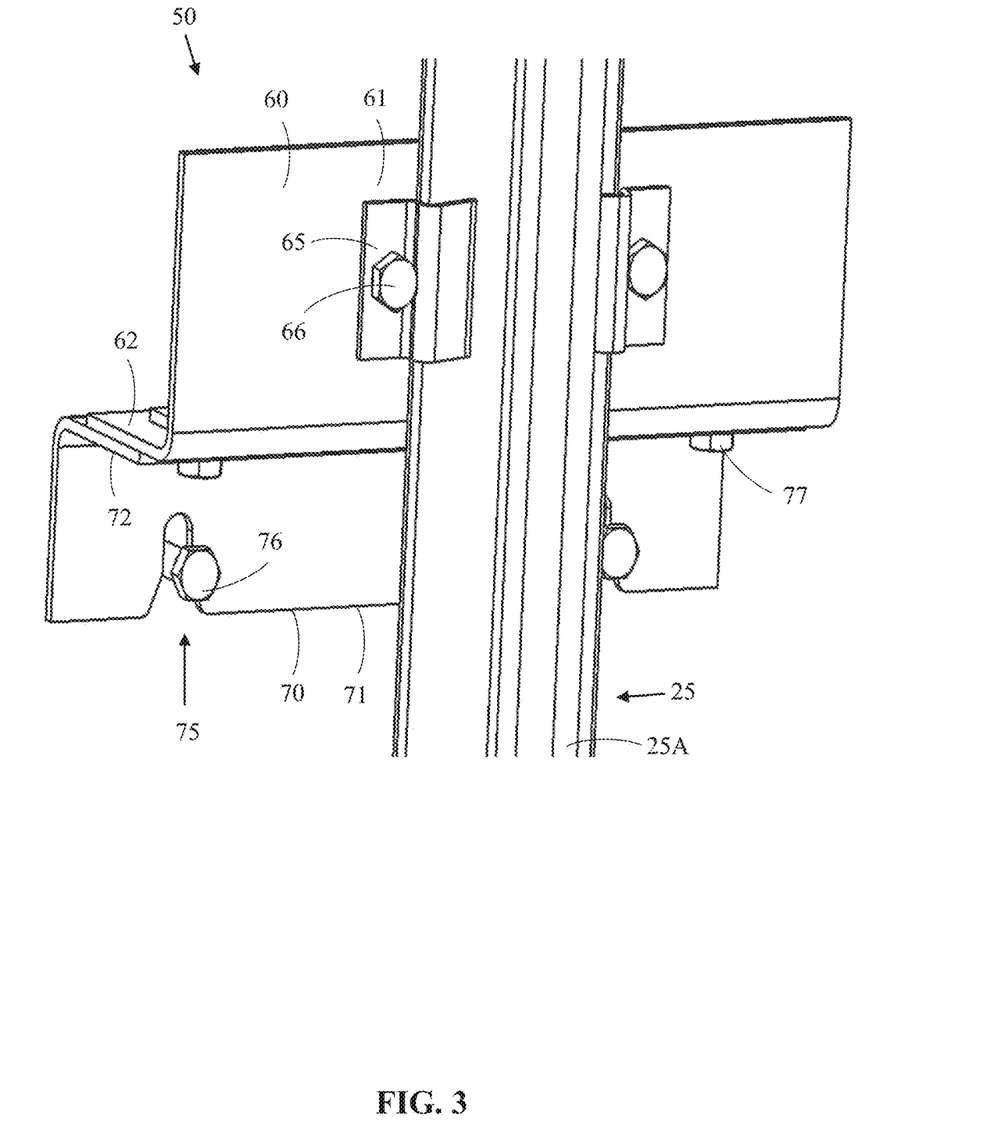
FIG. 3 shows a fastening bracket.

FIG. 3 shows a fastening bracket.

The fastening bracket 50 may be formed of two separate bracket parts 60, 70 that are movably attached to each other. The first bracket part 60 may have the shape of a letter L with a vertical portion 61 and a horizontal portion 62. The second bracket part 70 may also have the shape of a letter L with a vertical portion 71 and a horizontal portion 72. The first bracket part 60 may be attached to the guide rail 25 and a second bracket part 70 may be attached to a wall 21 in the shaft 20. The horizontal portions 62, 72 of the two bracket parts 60, 70 may be adjustably attached to each other.

The vertical portion 61 of the first bracket part 60 may be attached with a clamp 65 and a bolt 66 to the bottom portion 25A of the guide rail 25.

The vertical portion 71 of the second bracket part 70 may be attached to the wall 21 in the shaft 20 with anchor bolts 76. The vertical portion 71 in the second bracket part 70 may comprise oblong openings 75 being open at the lower end of the vertical portion 71 in the second bracket part 70. Holes for the anchor bolts 76 may be drilled into the walls 21 of the shaft 20 at predetermined positions already before the installation of the guide rails 25 is started. Anchor bolts 76 may be screwed into the holes. The anchor bolts 76 may be screwed only partly into the threading so that the head of the anchor bolts 76 is at a distance from the fastening surface.

The horizontal portion 62 of the first bracket part 60 and the horizontal portion 72 second bracket part 70 may be attached each other with bolts passing through oblong openings in the horizontal portion 62 of the first bracket part 60 and in the horizontal portion 72 of the second bracket part 70. The oblong openings may be dimensioned so that it is possible to fine adjust the position of the first bracket part 60 in relation to the second bracket part 70 to be able to align the guide rails 25.

Tightening of the bolts 76 will attach the second bracket part 70 of the fastening bracket 50 to the wall 21 in the shaft 20.

Figure 4:
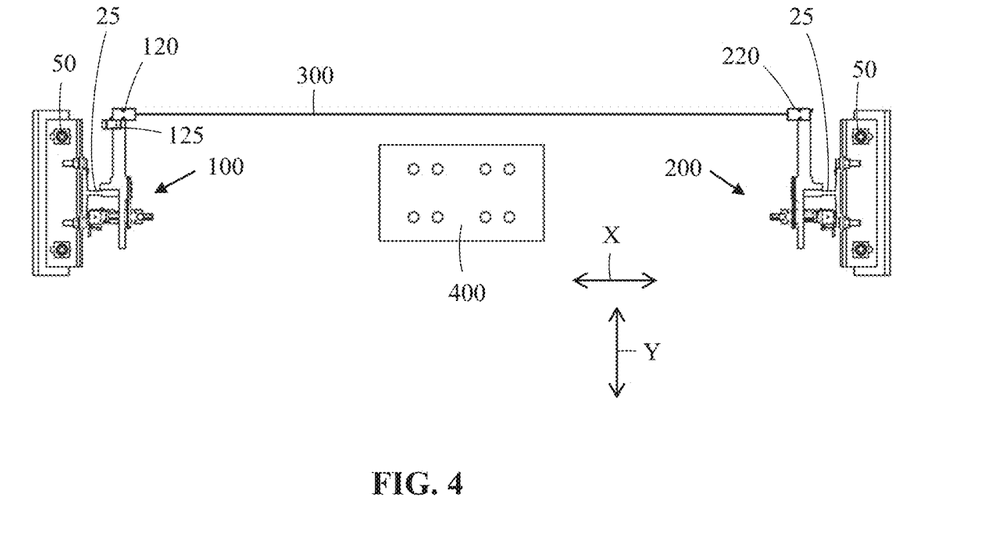
FIG. 4 shows a cross-sectional view of an arrangement for measuring alignment of guide rails.

The invention is not limited to the use of a fastening bracket 50 according to FIG. 4. The invention may be used in connection with any kind of fastening bracket 50.

FIG. 4 shows a cross-sectional view of an arrangement for measuring alignment of guide rails.

The arrangement comprises a first measurement device 100 arranged in connection with a first guide rail 25, a second measurement device 200 arranged in connection with a second opposite guide rail 25, and a wire 300 extending across the shaft between the two measurement devices 100, 200. The figure shows further a rope bundle 400 in the middle of the shaft. The ropes in the rope bundle 400 may extend between the car 10 and the counterweight 41. The ends of the wire 300 are positioned at a distance from the respective guide rail 25 so that the wire 300 may pass across the shaft without colliding with the rope bundle 400 in the shaft. The wire 300 by-passes the rope bundle 400 in the shaft. The wire 300 may be elastic or provided with spring means in the middle so that the length of the wire 300 is adapted to the width of the shaft.

Figure 5:
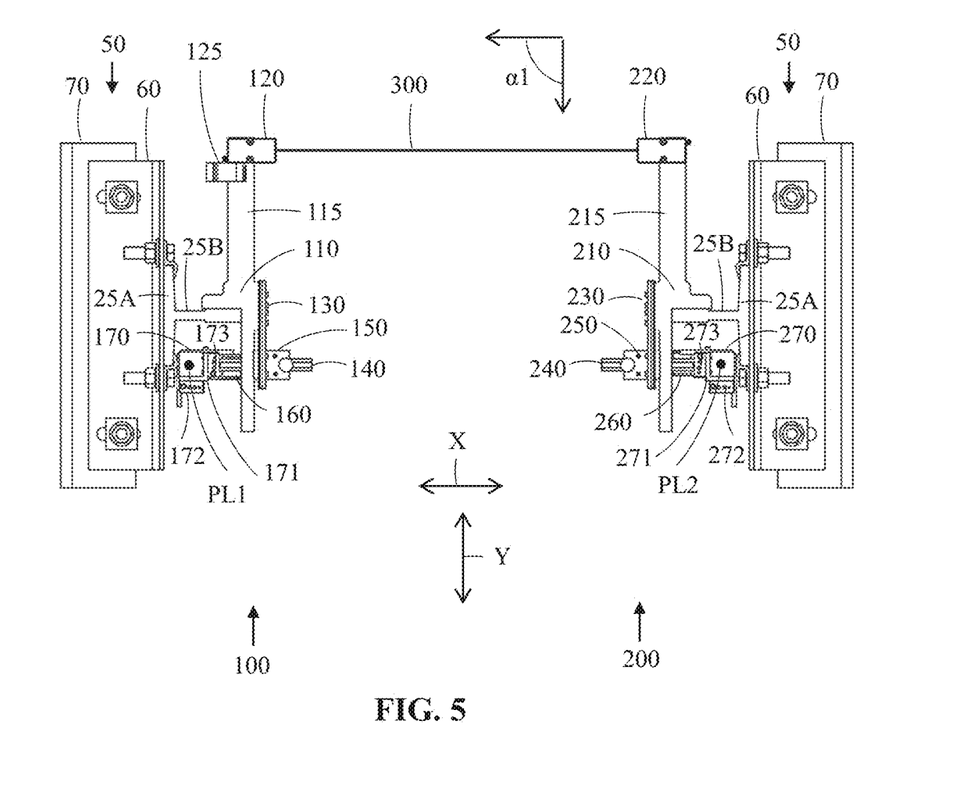
FIG. 5 shows an enlargement of the measurement devices shown in FIG. 4.

FIG. 5 shows an enlargement of the measurement devices shown in FIG. 4.

The two measurement devices 100, 200 may be mirror images of each other.

The guide rail 25 may have a cross-section forming a letter T comprising a planar bottom portion 25A and a planar support portion 25B protruding outwardly from the middle of the bottom portion 25A. The guide rail element 25 may be attached with fastening brackets 50 to a wall 21 in the shaft 20 from the bottom portion 25A of the guide rail element 25. The fastening bracket 50 may comprise a first bracket part 60 and a second bracket part 70 being adjustably attached to each other as described earlier. The support portion 25B of the guide rail element 25 may comprise two opposite side guide surfaces and one end guide surface for the guiding means of the car 10 or the counterweight 41. The guiding means of the car 10 may be provided with rollers or glide shoes acting on the guide surfaces of the support portion 25B of the guide rail element 25. The support portion 25B of the guide rail 25 extends in the second direction X i.e. in the DBG direction.

Each measurement device 100, 200 may comprise a guide shoe 110, 210 supported on guide surfaces of the support portion 25B of the guide rail 25. The guide shoe 110, 210 may be supported with magnets on the guide surfaces of the support portion 25B of the guide rail 25. The magnets may be provided in the guide shoes 110, 210. The magnets may be electromagnetic magnets that can be turned on and off by a switch in the measurement device 100, 200. The guide shoe 110, 210 may comprise a longitudinal support frame 115, 215 extending outwards from the guide shoe 110, 210. The support frame 115, 215 may extend in the third direction Y i.e. in the BTF direction. A longitudinal centre line of the support frame 115, 215 is thus perpendicular in respect of the direction of the support portion 25B of the guide rail 25.

Edge sensors 120, 220 may be attached to a second opposite end portion of the support frame 115, 215 in respect of the guide shoe 110, 210. The opposite ends of the wire 300 may be supported in a respective edge sensor 120, 220. The edge sensors 120, 220 detects the outer edges of the wire 300 and thereby the direction of the wire 300 in respect of the edge sensor 120, 220. The wire 300 is perpendicular in respect of an end surface of the edge sensor 120, 220 when there is no twist in the guide rails 25. The wire 300 is thus also perpendicular in respect of the longitudinal centre line of the support frame 115, 215 when there is no twist in the guide rails 25.

A first support arm 130, 230 may further be attached to the guide shoe 110, 210. The first support arm 130, 230 may extend outwards from the guide shoe 110, 120 in an opposite direction in respect of the support frame 115, 215. The first support arm 130, 230 may extend in the third direction Y.

A second support arm 140, 240 may be supported on the first support arm 130, 230. The second support arm 140, 240 may extend in the second direction X. The second direction X is perpendicular to the third direction Y. The second support arm 140, 240 may be supported via a connection device 150, 250 on the first support arm 130, 140. The connection device 150, 250 is supported on the first support arm 130, 230 so that the connection device 150, 250 is movable in the third direction Y. The second support arm 140, 240 may be supported in the connection device 150, 250 so that the second support arm 140, 240 is movable in the second direction X.

A measurement head 160, 260 may be attached on an outer end portion of the second support arm 140, 240. The measurement head 160, 260 may comprise sensor means 170, 270. The sensor means 170, 270 may comprise a measurement frame 171, 271 with two sensors 172, 173; 272, 273. The measurement frame 171, 271 may be substantially rectangular. The sensors 172, 173, 272, 273 may be positioned on adjacent sides of the frame 171, 271. The measurement frame 171, 271 may surround a respective plumb line PL1, PL2. The plumb line PL1, PL2 may be positioned within the measurement frame 171, 271 so that no contact between the plumb line PL1, PL2 and the measurement frame 171, 271 exists.

Each sensor 172, 173; 272, 273 may be formed of an optical sensor producing a bundle of parallel light beams. The light beams of the two sensors 172, 173; 272, 273 are thus perpendicular in relation to each other. The sensors 172, 173; 272, 273 may as a first option comprise a light source opposite to a light detector in which case the shadow of the plumb line PL1, PL2 may be detected on the light detector. The sensors 172, 173, 272, 273 may as a second option be based on the reflexion principle in which case the light source and the light detector are positioned on the same side. The light reflected from the plumb line PL1, PL2 may be detected in the light detector in the second option. The position of the plumb line PL1, PL2 within the measurement frame 171, 271 may thus be determined in the second direction X i.e. the direction between guide rails (DBG) and in the third direction Y i.e. the direction from the back wall to the front wall (BTF). A deviation of the plumb line PL1, PL2 from the desired position within the measurement frame 171, 271 at a measuring point means that the guide rail 25 deviates in a corresponding way from the desired position at said measuring point.

The measurement devices 100, 200 may be supported on the car 10 or to some other platform being arranged movable on the guide rails 25 so that the measurement devices 100, 200 are movable upwards and downwards in the shaft 20. The alignment of the guide rail 25 may thus be measured in each bracket position along the height of the shaft 20.

The height position of the car 10 or the platform in the shaft 20 may also be measured at each bracket position during the measurement process. The height position of the car 10 in the shaft 20 may be measured with an encoder and/or with a laser. The measurement results of the measurement devices 100, 200 may thus be allocated to the corresponding height position in the shaft 20.

The plumb lines PL1, PL2 may be formed of plumb wires.

The results of the measurements of the alignment of the guide rail 25 may be stored in a memory.

The figure shows an embodiment comprising an edge sensor 120, 220 in connection with each of the measurement devices 100, 200. The situation could, however, also be such that only one edge sensor 120, 220 is used. The single edge sensor 120, 220 could be positioned in connection with either one of the two measurement devices 100, 200.

The angle $\alpha 1$ between the wire 300 and the end of the edge sensor is also indicated in the figure. This angle $\alpha 1$ may be measured with the edge sensors 120, 220. This angle $\alpha 1$ indicates the twist between the two opposite guide rails 25. The angle $\alpha 1$ is 90 degrees in the figure i.e. there is no twist between the two opposite guide rails 25. The angle $\alpha 1$ could be measured with only one edge sensor 120, 220 arranged in connection with either of the two measurement devices 100, 200.

An edge sensor 120, 220 may be formed of a photoelectric sensor. The edge sensor may comprise an emitter emitting line array of light towards a reflector. The object to be measured, i.e. the wire 300, is positioned between the emitter and the reflector of the sensor. Light which is reflected from the reflector may be measured on a receiver in the sensor. The edges of the wire 300 may thus be determined and thereby also the direction of the wire 300 in relation to the measurement device 100, 200.

Figure 6:
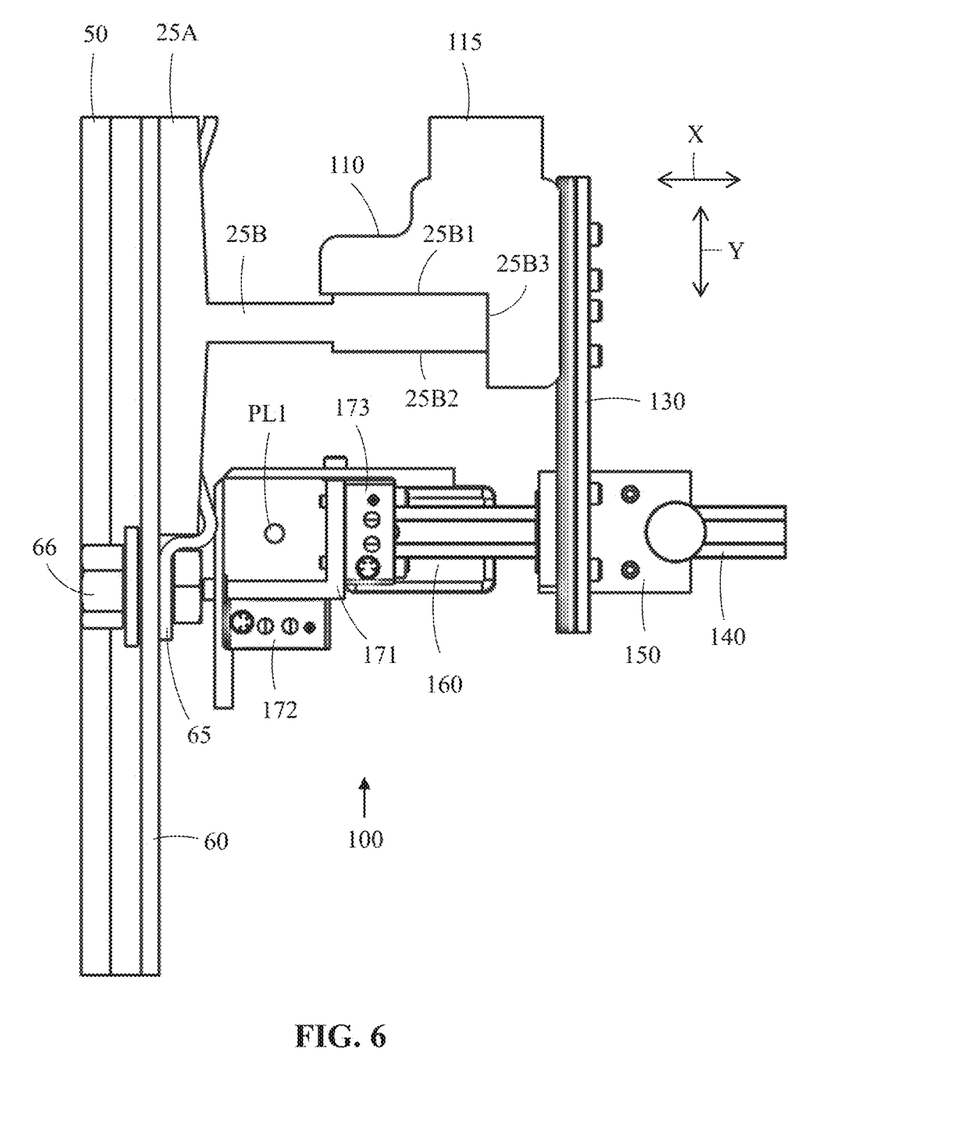
FIG. 6 shows a further enlargement of one of the measurement devices shown in FIG. 4.

FIG. 6 shows a further enlargement of one of the measurement devices shown in FIG. 4.

The base part 25A of the guide rail 25 may be attached with clamps 65 and bolts 66 to the first bracket part 60. The second bracket part 70 (not shown) may be attached to the wall construction in the shaft.

The guide shoe 110 of the first measurement device 100 may be supported by magnets on a first side guide surface 25B1 and on the end guide surface 25B3 of the support portion 25B of the guide rail 25. The second side guide surface 25B2 remains in this embodiment free. The guide shoe 110 could, however, be supported on all three guide surfaces 25B1, 25B2, 25B3 to further stabilize the guide shoe 110 on the guide rail 25.

The measurement frame 171 of the sensor means 170 in the measurement head 160 surrounds the plumb line PL1. The sensors 172, 173 in the sensor means 170 measure the position of the plumb line PL1 within the measurement frame 171 of the sensor means 170. The position of the plumb line PL1 within the measurement frame 171 of the sensor means 170 indicates the position of the guide rail 25 in the DBG and the BTF direction.

The wire 300 extending between the measurement devices 100, 200 is used to measure the twist of the guide rails 25.

The invention is not limited to the fastening bracket 50 shown in the figures. Any kind of adjustable fastening brackets 50 may be used in the invention.

The shaft 20 in the figures is intended for only one car 10, but the invention could naturally be used in shafts intended for several cars 10. Such elevator shafts 10 could be divided into sub-shafts for each car 10 with steel bars. Horizontal steel bars could be provided at predetermined intervals along the height of the shaft 20. A part of the guide rails 25 would then be attached to the steel bars in the shaft 20. Another part of the guide rails 25 would be attached to solid walls 21 in the shaft 20.

The invention may be used in low rise or in high rise buildings. The benefits of the invention are naturally greater in high rise buildings. High rise buildings may have a hoisting height over 75 meters, preferably over 100 meters, more preferably over 150 meters, most preferably over 250 meters.

The use of the invention is not limited to the elevator disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A method for aligning elevator guide rails comprising measuring a position of two opposite guide rails along a height of the guide rails with respect to a direction between the guide rails and with respect to a direction from a back to a front in a shaft with a plumb line and measurement devices arranged in connection with each of the guide rails, each measurement device of the measurement devices comprising a guide shoe supported on at least two guide surfaces of a guide rail from among the guide rails, a measurement frame connected to the guide shoe, and a sensor for sensing a position of the plumb line with respect to the measurement frame, and
measuring twist between the guide rails with a wire extending between the measurement devices and at least one edge sensor arranged in connection with at least one of the measurement devices, the at least one edge sensor measuring an angle of the wire with respect to the at least one of the measurement devices to determine the twist of the guide rails.

2. The method as claimed in claim 1, further comprising measuring distance between the guide rails with a laser distance sensor arranged in connection with one of the measurement devices.

3. The method as claimed in claim 1, further comprising storing measurement results into a memory.

4. The method as claimed in claim 3, further comprising adjusting the position of the guide rails based on the measurement results.

5. The method as claimed in claim 1, wherein the measuring the twist comprises
emitting light from an emitter toward a reflector, the wire being between the emitter and the reflector;
receiving light reflected from the reflector; and
detecting outer edges of the wire based on the light reflected from the reflector.

6. An arrangement for aligning elevator guide rails comprising
a plumb line and measurement devices arranged in connection with each of two opposite guide rails for measuring positions of the guide rails along a height of the guide rails with respect to a direction between the guide rails and with respect to a direction from a back to a front in a shaft, each measurement device of the measurement devices comprising a guide shoe supported on at least two guide surfaces of a guide rail of the guide rails, a measurement frame connected to the guide shoe, and a first sensor configured to sense a position of the plumb line with respect to the measurement frame,
a wire extending between the measurement devices,
an edge sensor arranged in connection with at least one of the measurement devices, the edge sensor configured to measure an angle of the wire with respect to the at least one of the measurement devices to determine twist of the guide rails.

7. The arrangement as claimed in claim 6, further comprising
a laser distance sensor arranged in connection with one of the measurement devices, the laser distance sensor configured to measure distance between the guide rails.

8. The arrangement as claimed in claim 6, further comprising
a memory for storing measurement results.

9. The arrangement of claim 6, wherein the edge sensor comprises
an emitter configured to emit light toward a reflector, wherein the wire is configured to be between the emitter and the reflector; and
a receiver configured to receive light reflected from the reflector,
wherein the edge sensor is configured to detect outer edges of the wire based on the light reflected from the reflector.

10. An arrangement for aligning elevator guide rails in an elevator shaft, the arrangement comprising:
a first measurement device having a first guide shoe supported on at least two guide surfaces of a first guide rail element of a first guide rail, the first guide rail being supported on a first side wall of the elevator shaft;
a second measurement device having a second guide shoe on at least two guide surfaces of a second guide rail element of a second guide rail, the second guide rail being supported on a second side wall of the elevator shaft, the second side wall being opposite the first side wall;
a wire extending across the elevator shaft between the first and second measurement devices; and
a first edge sensor attached to an end portion of a support frame of the first guide shoe,
the first edge sensor configured to support a first end of the wire therein, detect first outer edges of the wire at the first end of the wire, and determine a first angle between the wire and an end of the first edge sensor based on the detected first outer edges of the wire to provide a measure of twist of the first guide rail element.

11. The arrangement according to claim 10, further comprising:
a second edge sensor attached to an end portion of a support frame of the second guide shoe,
the second edge sensor configured to support a second end of the wire therein, detect second outer edges of the wire at the second end of the wire, and determine a second angle between the wire and an end of the second edge sensor based on the detected second outer edges of the wire to provide a measure of twist of the second guide rail element,
the second end of the wire being opposite the first end of the wire.

12. The arrangement as claimed in claim 10, wherein the first edge sensor comprises:
   an emitter configured to emit light toward a reflector, wherein the wire is configured to be between the emitter and the reflector; and
   a receiver configured to receive light reflected from the reflector,
   wherein the first edge sensor is configured to detect the first outer edges of the wire based on the light reflected from the reflector.

13. The arrangement as claimed in claim 11, wherein the second edge sensor comprises:
   an emitter configured to emit light toward a reflector, wherein the wire is configured to be between the emitter and the reflector; and
   a receiver configured to receive light reflected from the reflector,
   wherein the second edge sensor is configured to detect the second outer edges of the wire based on the light reflected from the reflector.

14. The arrangement of claim 10, wherein the first and second measurement devices are supported on an elevator car and are configured to be respectively movable along the first and second guide rails.

15. The arrangement of claim 10, wherein the first and second measurement devices are supported on a platform and are configured to be respectively movable along the first and second guide rails.

16. The arrangement as claimed in claim 10, further comprising
   a laser distance sensor arranged in connection with one of the first and second measurement devices, the laser distance sensor configured to measure distance between the first and second guide rails.

17. The arrangement as claimed in claim 10, further comprising
   a memory for storing measurement results.

\* \* \* \* \*